(12) United States Patent
Kouno et al.

(10) Patent No.: US 11,923,789 B2
(45) Date of Patent: Mar. 5, 2024

(54) POWER CONVERTER

(71) Applicants: KABUSHIKI KAISHA TOSHIBA, Tokyo (JP); Toshiba Infrastructure Systems & Solutions Corporation, Kawasaki (JP)

(72) Inventors: Yuusuke Kouno, Tokyo (JP); Yoichi Morishima, Tokyo (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/901,389

(22) Filed: Sep. 1, 2022

(65) Prior Publication Data

US 2023/0074852 A1 Mar. 9, 2023

(30) Foreign Application Priority Data

Sep. 9, 2021 (JP) ................................. 2021-146868

(51) Int. Cl.
 *H02M 7/539* (2006.01)
(52) U.S. Cl.
 CPC .................... *H02M 7/539* (2013.01)
(58) Field of Classification Search
 CPC ...... H02M 7/539; H02M 7/5395; H02M 7/54; H02M 7/56; H02M 7/537; H02M 7/525; H02M 7/527
 See application file for complete search history.

(56) References Cited

U.S. PATENT DOCUMENTS

| 5,493,485 A | * | 2/1996 | Okado | H02M 7/48 |
| | | | | 363/56.01 |
| 2005/0135031 A1 | | 6/2005 | Colby et al. | |
| 2011/0175662 A1* | | 7/2011 | Said El-Barbari | H02S 40/32 |
| | | | | 327/319 |
| 2011/0215652 A1 | | 9/2011 | Gengenbach et al. | |
| 2015/0380942 A1 | | 12/2015 | Premm et al. | |
| 2021/0288592 A1* | | 9/2021 | Kouno | H02M 1/325 |

FOREIGN PATENT DOCUMENTS

| JP | 2006-101634 A | 4/2006 |
| JP | 2018-152933 A | 9/2018 |
| JP | 2021-145437 A | 9/2021 |

OTHER PUBLICATIONS

European Patent Office, European Search Report in Application No. EP 22 19 3131, 7 pages (dated Feb. 8, 2023).

* cited by examiner

*Primary Examiner* — Nguyen Tran
(74) *Attorney, Agent, or Firm* — Finnegan, Henderson, Farabow, Garrett & Dunner, LLP

(57) ABSTRACT

According to one embodiment, a power converter includes an inverter and a controller. The inverter operates in an interconnected operation mode in which a grid is connected to an electric load and an isolated operation mode in which the inverter is connected to the electric load, for generating power from a local power supply. The controller detects a frequency difference and a phase difference between an inverter output from the inverter and grid power. The controller calculates, based on the frequency difference and the phase difference, an output frequency pattern to be used for synchronizing the inverter output with the grid power. The controller controls, when switching from the isolated operation mode to the interconnected operation mode, a frequency of the inverter output based on the output frequency pattern.

12 Claims, 10 Drawing Sheets

(a)

(b)

(c)

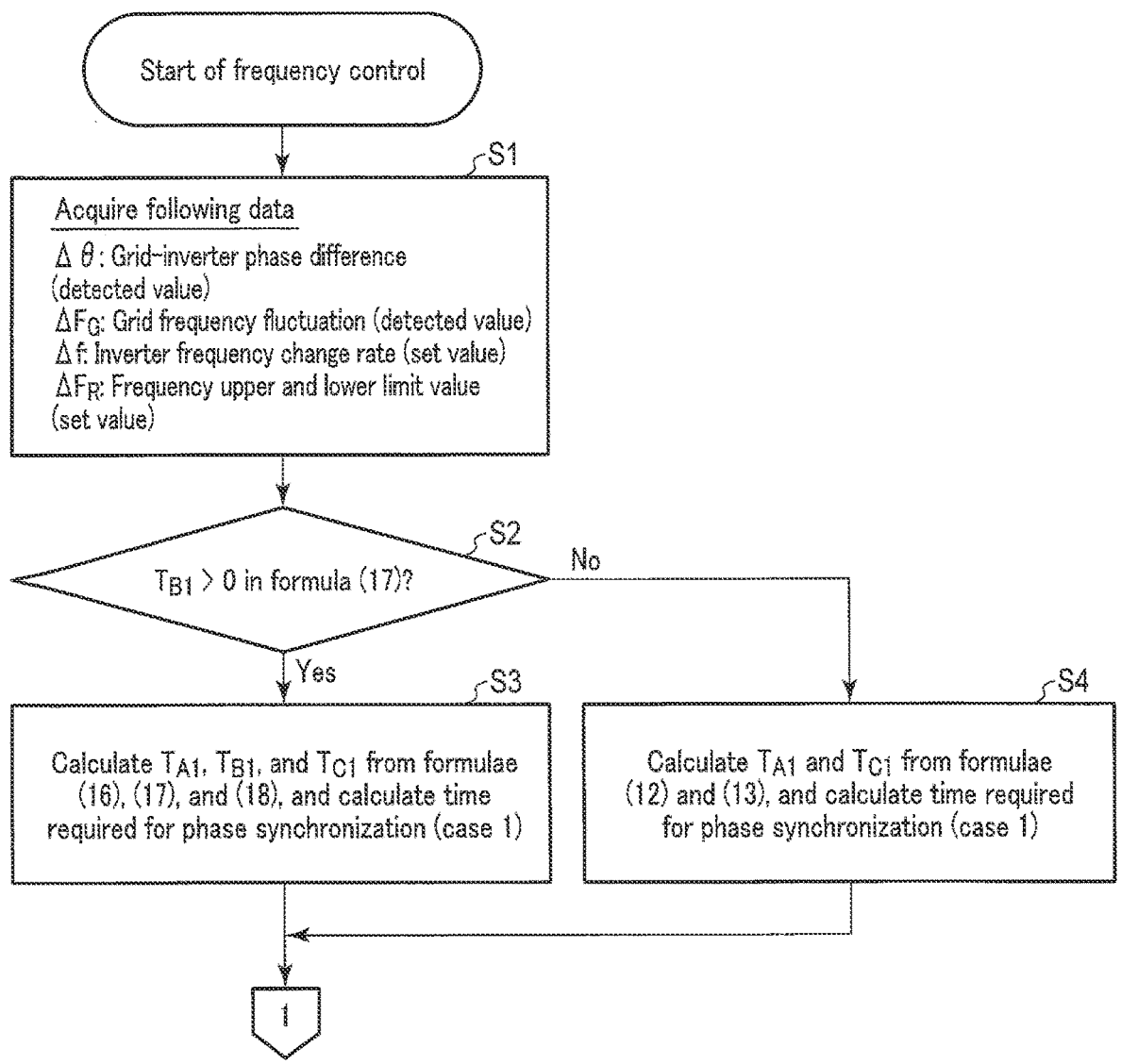
F I G. 10A

POWER CONVERTER

CROSS-REFERENCE TO RELATED APPLICATIONS

This application is based upon and claims the benefit of priority from the Japanese Patent Application No. 2021-146868, filed Sep. 9, 2021, the entire contents of which are incorporated herein by reference.

FIELD

Embodiments described herein relate generally to a power converter.

BACKGROUND

Power converters are widely used in intelligent buildings, homes, public facilities, solar power generation farms, etc. This type of device, also known as a power conditioning subsystem (PCS), is equipped with an inverter that converts power, and is used, for example, to switch between power generated by a distributed power supply such as a solar cell and grid power.

When power fails in a power grid, a PCS for distributed power supplies can supply power to an electric load by performing an isolated operation. When power is restored in the power grid, the PCS performing the isolated operation is switched from the isolated operation to an interconnected operation; however, when there is a phase difference between an output voltage of the inverter and a grid voltage, the PCS may be stopped by overvoltage or overcurrent. Therefore, a PCS halts its isolated operation when power is restored in a power grid, and then switches to an interconnected operation with the power grid.

However, when the PCS halts, power supply to an electric load stops, and an instantaneous power failure state may be caused; therefore, it is desired that, upon power restoration of the power grid, the PCS is switched from the isolated operation to the interconnected operation with no interruption so that power is continuously supplied to the electric load. As a countermeasure when there is a phase difference between the inverter output voltage and the grid voltage during isolated operation, a technique of synchronizing the inverter output voltage phase with the grid voltage phase before interconnection is known, such as a phase synchronization method that adds a fixed correction value to a phase command of a conversion circuit.

BRIEF DESCRIPTION OF THE DRAWINGS

FIG. 10A is a flowchart showing an example of a processing procedure related to control of an output frequency of an inverter 6.

DETAILED DESCRIPTION

In general, according to one embodiment, a power converter includes an inverter and a controller. The inverter operates in an interconnected operation mode in which a grid is connected to an electric load and an isolated operation mode in which the inverter is connected to the electric load, for generating power from a local power supply. The controller detects a frequency difference and a phase difference between an inverter output from the inverter and grid power. The controller calculates, based on the frequency difference and the phase difference, an output frequency pattern to be used for synchronizing the inverter output with the grid power. The controller controls, when switching from the isolated operation mode to the interconnected operation mode, a frequency of the inverter output based on the output frequency pattern.

Hereinafter, a power converter according to an embodiment will be described in detail with reference to the accompanying drawings.

<Configuration>

Figure 1:
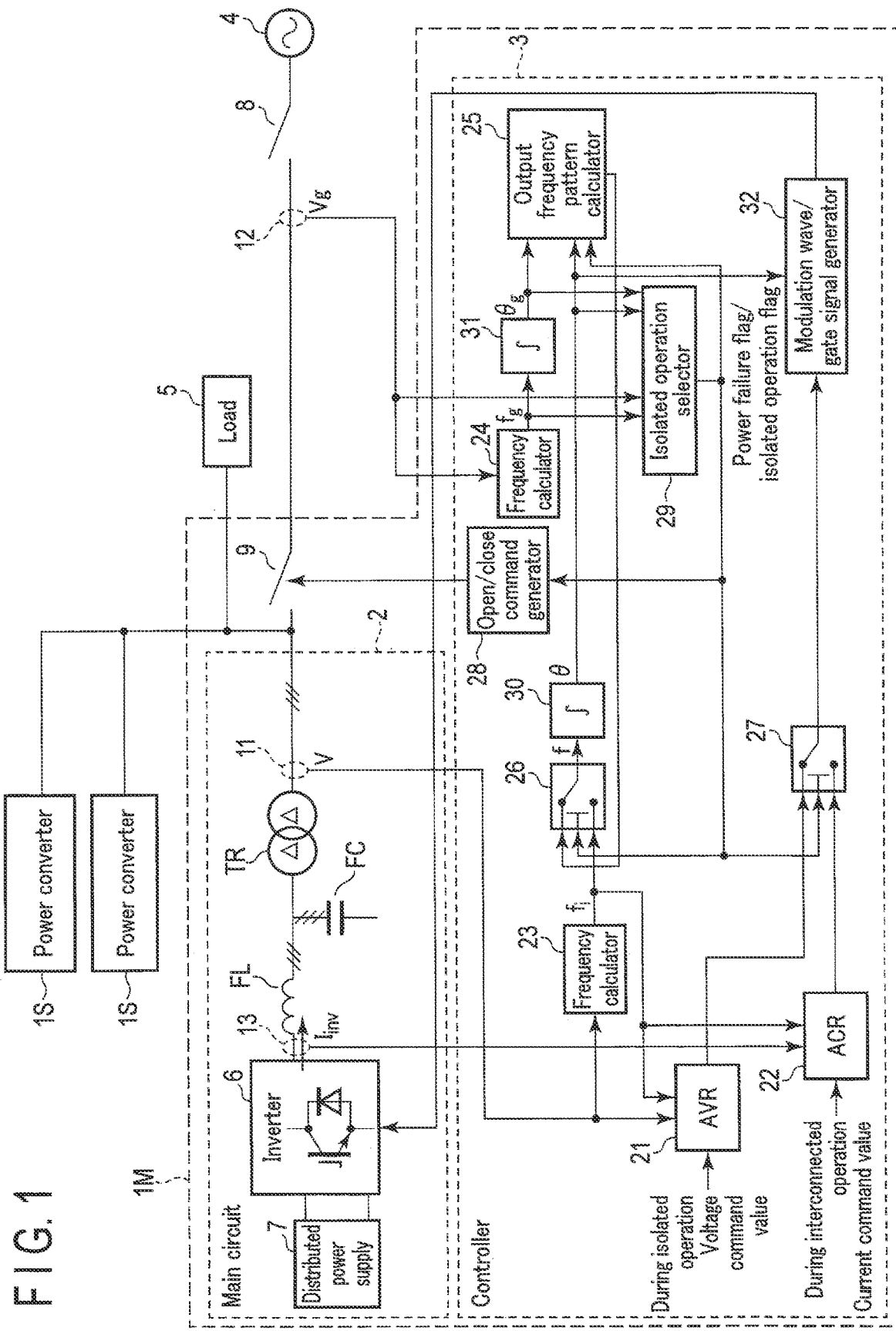
FIG. 1 is a block diagram showing an example of a power receiving system including a power converter according to an embodiment.

FIG. 1 is a block diagram showing an example of a power receiving system including the power converter according to the embodiment. The power receiving system shown in FIG. 1 includes a plurality of power converters 1 connected to an electric load 5. The power converters include a power converter (a master power converter) 1M and a plurality of power converters (slave power converters) 1S. The power converters 1S operate based on a command from the power converter 1M. The power converter 1M outputs a command to the power converters 1S so that the power converters 1 cooperate with one another.

The power converter is provided between a power grid 4 and the electric load 5. The electric load 5 can also receive power from the power grid 4. The power grid 4 has a switchgear 8. When a failure occurs in the power grid 4, the switchgear 8 is opened, whereby the power grid 4 is disconnected from the electric load 5.

The electric load 5 is a device operated by electric power. The electric load 5 is, for example, various electronic devices, lighting devices installed in facilities, elevators, air conditioning equipment, etc. That is, in various consumers such as general households, commercial facilities, industrial facilities, public facilities, or medical facilities, a device to which electric power is supplied via a plug can be assumed as a load 5.

The power converter 1 includes a main circuit 2, a controller 3, and a switchgear 9.

The main circuit 2 includes a distributed power supply 7, an inverter 6, a reactor FL, a transformer TR, and a capacitor FC.

The distributed power supply 7 as a local power supply may include, for example, at least one DC power supply, such as a solar battery, a fuel battery, or a secondary battery. The distributed power supply 7 may be formed by combining the above plurality of types of DC power supplies. The distributed power supply 7 may, for example, output DC power to the inverter 6, and be charged with DC power supplied from the inverter 6.

The inverter 6 generates equivalent AC power to AC power (grid power) supplied from the power grid 4, from the distributed power supply 7. The inverter 6 is, for example, a three-phase AC inverter capable of mutual conversion between DC power and three-phase AC power. The inverter 6 includes U-phase, V-phase, and W-phase arms electrically connected between a DC terminal on a positive side and a DC terminal on a negative side. Each phase arm includes an upper switching element and a lower switching element, and is electrically connected to a corresponding AC terminal between the upper switching element and the lower switching element.

The reactor FL and capacitor FC form a filter circuit that eliminates noise from AC power output from the inverter 6, and is interposed between the AC terminal of each phase of the inverter 6 and the transformer TR. The reactor FL is connected in series to an AC line connected between the AC terminal of the inverter 6 and the transformer TR.

The transformer TR is an insulating transformer capable of changing the voltage of AC power transferred between the inverter 6 and the power grid 4. The transformer TR includes a first coil and a second coil that are insulated from each other. The first coil is electrically connected to the AC terminal of the inverter 6 via the filter circuit. The second coil is electrically connected to the power grid 4 via the switchgears 9 and 8, and is electrically connected to the electric load 5.

The controller 3 includes, for example, at least one processor and a memory storing therein a program to be executed by the at least one processor, and is formed to realize various functions to be described below. For example, the controller 3 synchronizes a frequency and a phase of an inverter output with those of the grid power before switching from an isolated operation mode to an interconnected operation mode.

The controller 3 generates and outputs a gate signal for controlling operations of the switching elements of the inverter 6 based on a current value and a voltage value of AC power output from the inverter 6, a voltage value (grid voltage value) of AC power output from the power grid 4, and a command value input from an external device.

The controller 3 includes a voltage control unit 21 such as an automatic voltage regulator (AVR), a current control unit 22 such as an automatic current regulator (ACR), a first frequency calculator 23, an inverter frequency selector 26, an inverter voltage command value selector 27, a first phase calculator 30, a second frequency calculator 24, an isolated operation selector 29, a second phase calculator 31, a modulation wave/gate signal generator 32, an output frequency pattern calculator 25, and an open/close command generator 28.

Further, the controller 3 includes a first voltage detector 11, a second voltage detector 12, and a current detector 13, and based on the detected values of detectors, detects a frequency difference and a phase difference between the inverter output from the inverter 6 and the grid power.

The first voltage detector 11 detects a value of a voltage V of the AC power output from the inverter 6. The value of the voltage (inverter output voltage) V detected by the first voltage detector 11 is supplied to the voltage control unit 21 and the first frequency calculator 23.

The second voltage detector 12 detects a value of a voltage Vg of the AC power output from the power grid 4. The value of the voltage (grid voltage) Vg detected by the second voltage detector 12 is supplied to the second frequency calculator 24 and the isolated operation selector 29.

The current detector 13 detects a value of a current Iinv of the AC power output from the inverter 6. The current detector 13, for example, detects the value of the current Iinv for at least two phases of the three-phase AC power output from the inverter 6. The value of the current (inverter current) Iinv detected by the current detector 13 is supplied to the current control unit 22.

The first frequency calculator 23 acquires the value of the output voltage V of the inverter from the first voltage detector 11, and calculates and outputs a frequency fi of the output voltage of the inverter 6. The value of the frequency output from the first frequency calculator 23 is supplied to the voltage control unit 21, the current control unit 22, and the inverter frequency selector 26.

The second frequency calculator 24 acquires the value of the grid voltage Vg from the second voltage detector 12, and calculates and outputs a value of a frequency fg of an output voltage of the power grid 4. The value of the frequency fg output from the second frequency calculator 24 is supplied to the isolated operation selector 29 and the second phase calculator 31.

The second phase calculator 31 acquires the value of the frequency fg of the output voltage of the power grid from the second frequency calculator 24, and calculates a value of a phase θg by integrating the value of the frequency fg. The value of the phase θg output from the second phase calculator 31 is supplied to the output frequency pattern calculator 25 and the isolated operation selector 29.

The isolated operation selector 29 acquires the value of the grid voltage Vg from the second voltage detector 12, acquires the value of the frequency fg of the grid voltage from the second frequency calculator 24, and determines whether or not the power grid 4 has a power failure. For example, the isolated operation selector 29 determines whether or not the power grid 4 has a power failure based on whether or not each of the value of the grid voltage Vg and the value of the grid frequency fg is within a predetermined range. When it is determined that the power grid 4 has a power failure, a power failure flag is set to "1", whereas, when it is determined that the power grid 4 is normal, for example, the power failure flag is set to "0".

Furthermore, the isolated operation selector 29 acquires the phase value θg of the grid voltage Vg from the second phase calculator 31, and also acquires the phase value θ of the output voltage V of the inverter 6 from the first phase calculator 30. Then, the isolated operation selector 29, based on the phase value θg and the phase value θ, sets an operation mode of the power converter 1 to either an isolated operation mode or an interconnected operation mode.

For example, when a difference between the phase value θg of the grid voltage Vg and the phase value θ of the output voltage V of the inverter 6 is smaller than a predetermined threshold, the isolated operation selector 29 determines that the operation mode of the power converter 1 operating in an isolated operation mode needs to be switched to the interconnected operation mode and changes an isolated operation flag from "1" to "0". In the interconnected operation mode, the power converter 1 performs an interconnected operation with the power grid 4. Further, when the power grid 4 has a power failure, for example, the isolated operation selector 29 determines that the power converter 1 operating in the interconnected operation mode needs to be switched to an isolated operation mode, and changes the isolated operation flag from "0" to "1".

The isolated operation selector 29 supplies the power failure flag and the isolated operation flag to the inverter frequency selector 26, the inverter voltage command value selector 27, the open/close command generator 28, and the output frequency pattern calculator 25.

The open/close command generator 28 generates and outputs an open/close command for the switchgear 9 in accordance with the values of the power failure flag and isolated operation flag supplied from the isolated operation selector 29. The open/close command generator 28 generates an open/close command to open the switchgear 9 when the power failure flag is "1", and generates an open/close command to close the switchgear 9 when the power failure flag is "0" and the isolated operation flag is "0".

The voltage control unit 21 acquires a voltage command value input from the external device, a value of the output voltage V of the inverter 6, and an output value of the first frequency calculator 23. The voltage control unit 21, while the power converter 1 is operating in the isolated operation mode, calculates an AVR voltage command value for the inverter 6 based on the voltage command value input from the external device.

The voltage control unit 21, based on the acquired values, calculates the voltage command value for the inverter 6 so that the value of the output voltage V follows the externally received voltage command value, and outputs the calculated voltage command value for the inverter 6. The voltage control unit 21 is, for example, a proportional-plus-integral (PI) control circuit that calculates a voltage command value so that a difference between the value of the output voltage V and the voltage command value input from the external device becomes zero. The voltage command value output from the voltage control unit 21 is supplied to the inverter voltage command value selector 27.

The current control unit 22 acquires a current command value input form the external device, a value of the output current Iinv of the inverter 6, and an output value of the first frequency calculator 23. The current control unit 22 can acquire a current command value from the external device when the power converter 1 is operating in the interconnected operation mode and calculate a voltage command value for the inverter 6.

The current control unit 22 uses the acquired values to calculate a voltage command value for the inverter 6 so that the value of the output current Iinv follows the current command value received from the external device, and outputs the calculated voltage command value for the inverter 6. The current control unit 22 is, for example, a proportional-plus-integral (PI) control circuit that calculates a voltage command value so that a difference between the value of the output current Iinv and the current command value input from the external device becomes zero. The voltage command value output from the current control unit 22 is supplied to the inverter voltage command value selector 27.

The inverter frequency selector 26, as a frequency control unit, controls the frequency of the inverter output based on an output frequency pattern to be described later. The inverter frequency selector 26 selects either one of the output value of the first frequency calculator 23 and the output value of the output frequency pattern calculator 25 based on the values of the power failure flag and isolated operation flag supplied from the isolated operation selector 29, and outputs the selected output value as a value of the frequency f of the output voltage of the inverter 6. The value of the frequency f output from the inverter frequency selector 26 is supplied to the first phase calculator 30.

When the power converter 1 is operating in the interconnected operation mode, the inverter frequency selector 26 selects the output value of the first frequency calculator 23 as the value of the frequency f of the output voltage of the inverter 6. That is, when the power failure flag is "0" and the isolated operation flag is "0", the inverter frequency selector 26 selects the output value of the first frequency calculator 23 as the value of the frequency f of the output voltage of the inverter 6.

When the power converter 1 is operating in the isolated operation mode, the inverter frequency selector 26 selects the output value of the output frequency pattern calculator 25 as the value of the frequency f of the output voltage of the inverter 6. That is, when the power failure flag is "1" and the isolated operation flag is "1", the inverter frequency selector 26 selects a preset value of a rated frequency, which is the output value of the output frequency pattern calculator 25, as the value of the frequency f of the output voltage of the inverter 6.

When the power grid 4 recovers from a power failure while the power converter 1 is operating in the isolated operation mode, i.e., when the isolated operation flag is "1" and the power failure flag changes from "1" to "0", the output value of the output frequency pattern calculator 25 becomes a value that changes based on an output frequency pattern, as will be described later, and is output from the inverter frequency selector 26 as the value of the frequency f of the output voltage of the inverter 6.

The first phase calculator 30 integrates the value of the frequency f supplied from the inverter frequency selector 26 to calculate the value of the phase θ of the output voltage of the inverter 6. The first phase calculator 30 supplies the calculated value of the phase θ to the isolated operation selector 29, the output frequency pattern calculator 25, and the modulation wave/gate signal generator 32.

The inverter voltage command value selector 27 selects one of the output value of the voltage control unit 21 and the voltage value of the current control unit 22 based on the values of the power failure flag and isolated operation flag supplied from the isolated operation selector 29, and outputs the selected output value as the voltage command value of the inverter 6. The voltage command value output from the inverter voltage command value selector 27 is supplied to the modulation wave/gate signal generator 32.

When the power converter 1 is operating in the interconnected operation mode, the inverter voltage command value selector 27 outputs the output value of the current control unit 22 as the voltage command value for the inverter 6. That is, when the power failure flag is "0" and the isolated operation flag is "0", the inverter voltage command value selector 27 outputs the output value of the current control unit 22 as the voltage command value for the inverter 6.

When the power converter 1 is operating in the isolated operation mode, the inverter voltage command value selector 27 outputs the output value of the voltage control unit 21 as the voltage command value for the inverter 6. That is, when the isolated operation flag is "1", the inverter voltage command value selector 27 outputs the output value of the voltage controller 21 as the voltage command value for the inverter 6.

The modulation wave/gate signal generator 32 generates a modulation wave based on the value of the phase θ of the output voltage of the inverter 6 acquired from the first phase calculator 30 and the voltage command value acquired from the inverter voltage command value selector 27. The modulation wave/gate signal generator 32 compares the generated modulation wave with a carrier wave to generate a gate signal of each switching element of the inverter 6, and outputs the gate signal to the inverter 6.

When the operation mode of the power converter 1 is switched from the isolated operation mode to the interconnected operation mode (when the power failure flag changes from "1" to "0"), the output frequency pattern calculator 25 calculates a pattern of the frequency f of the output voltage V of the inverter 6 so that the frequency f is synchronized with a frequency of the grid voltage Vg. That is, the output frequency pattern calculator 25 calculates the output frequency pattern based on the frequency difference and the phase difference between the inverter output and the grid power detected by the detection units. The output frequency pattern shows a change of the output frequency of the inverter 6 with respect to time in a synchronization period required for synchronizing the inverter output and the grid power.

Figure 2:
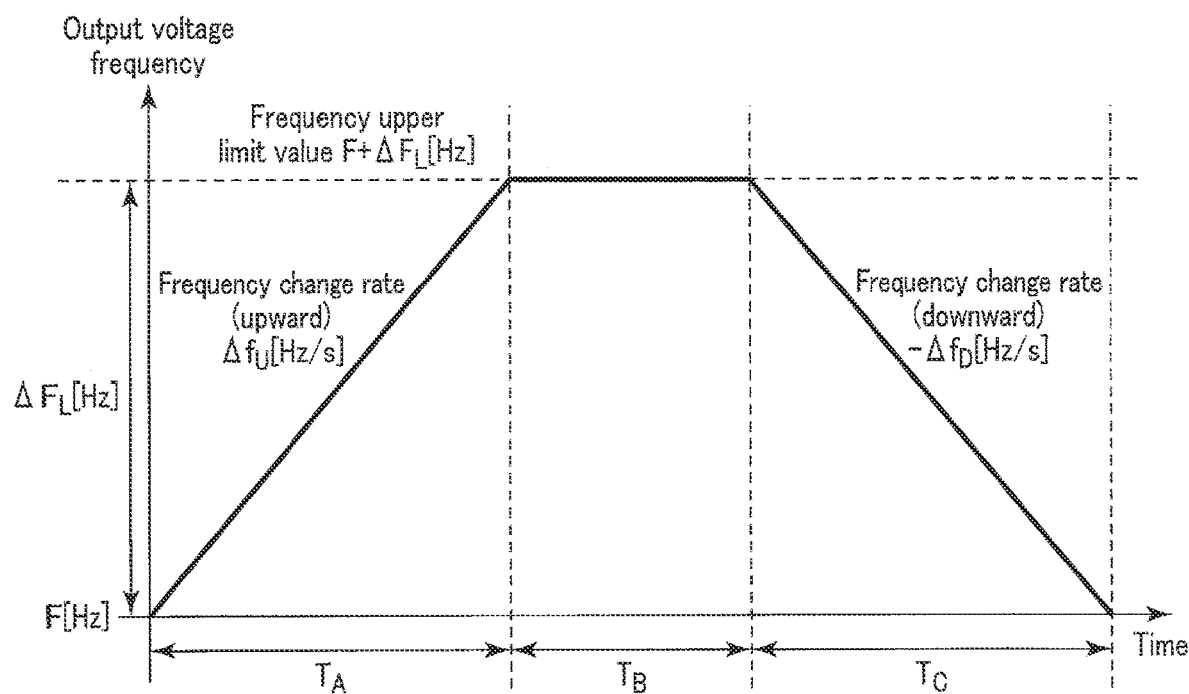
FIG. 2 is a diagram showing an example of a frequency pattern calculated in an output frequency pattern calculator 25 shown in FIG. 1.

FIG. 2 is a diagram showing an example of a frequency pattern calculated by the output frequency pattern calculator 25 shown in FIG. 1. The output frequency pattern includes at least periods $T_A$ and $T_C$ in which the frequency is changed at a preset frequency change rate. In the example shown in FIG. 2, the output frequency pattern further includes a period $T_B$ in which the frequency takes a constant value at a frequency upper limit value or frequency lower limit value. The upper limit and lower limit will be decided by a range as power supplier's quality. For example, a power company needs to supply electricity with some variance like 60 Hz+/−0.5 Hz. In this case the upper limit will be 60.5 Hz and the lower limit will be 59.5 Hz.

Shown herein is an example of the output frequency pattern for synchronizing the phase θ of the output voltage V of the inverter 6 with the phase θg of the grid voltage Vg when the phase θg is advanced with respect to the phase θ.

When the phase θg of the grid voltage Vg is delayed with respect to the phase θ of the output voltage V of the inverter 6, an output frequency pattern is generated in which the frequency f of the output voltage V of the inverter 6 is decreased at a preset frequency change rate for the predetermined period $T_A$ and, after passing through the period $T_B$, in which the frequency f takes a constant value at the frequency lower limit value where necessary, is raised at a preset frequency change rate for the predetermined period $T_C$ back to the rated frequency.

In the following description, a phase difference between the phase θg of the grid voltage Vg and the phase θ of the output voltage V of the inverter 6 is denoted by Δθ. In addition, a rated frequency is denoted by F [Hz], a frequency fluctuation upper limit value is denoted by $\Delta F_L$ [Hz], a frequency change rate (upward) is denoted as $\Delta f_U$ [Hz/s], and a frequency change rate (downward) is denoted as $-\Delta f_D$ [Hz/s]. Furthermore, a period of an operation at the upward frequency change rate is denoted by $T_A$ [s], a period of an operation at a constant value at the frequency upper limit value (or frequency lower limit value) is denoted by $T_B$ [s], and a period of an operation at the downward frequency change rate is denoted by $T_C$ [s].

First, in the period $T_A$, the frequency f is changed from the rated frequency F to a frequency upper limit value F+$\Delta F_L$; accordingly, the period $T_A$ can be expressed by formula (1).

[Formula 1]

$$T_A = \frac{\Delta F_L}{\Delta f_U} \tag{1}$$

A phase change amount $\Delta\theta_A$ in the period $T_A$ can be expressed by formula (2).

[Formula 2]

$$\Delta\theta_A = \int_0^{T_A} 2\pi \Delta f_U t\, dt = \pi \Delta f_U (T_A)^2 = \pi \frac{\Delta F_L^2}{\Delta f_U} \tag{2}$$

Similarly, the frequency f changes from the frequency upper limit value F+$\Delta F_L$ back to the rated frequency F in the period $T_C$. Thus, the period $T_C$ and the phase change amount $\Delta\theta_C$ can be expressed by formulae (3) and (4).

[Formula 3]

$$T_C = \frac{\Delta F_L}{\Delta f_D} \tag{3}$$

$$\Delta\theta_C = \pi \frac{\Delta F_L^2}{\Delta f_D} \tag{4}$$

The phase change amount $\Delta\theta_B$ in the period $T_B$ and the period $T_B$ can be obtained by formulae (5) and (6).

[Formula 4]

$$\Delta\theta_B = \Delta\theta - \Delta\theta_A - \Delta\theta_C \tag{5}$$

$$T_B = \frac{\Delta\theta_B}{2\pi\Delta F_L} = \frac{\Delta\theta - \Delta\theta_A - \Delta\theta_C}{2\pi\Delta F_L} = \frac{\Delta\theta}{2\pi\Delta F_L} - \frac{1}{2}\left(\frac{\Delta F_L}{\Delta f_U} + \frac{\Delta F_L}{\Delta f_D}\right) \tag{6}$$

The period $T_A$ is obtained from formula (1), $T_B$ is obtained from formula (5), and $T_C$ is obtained from formula (3). Thus, the output frequency pattern calculator 25 can determine the output frequency pattern of the output voltage V of the inverter 6 by calculating the phase difference Δθ between the phase θg of the grid voltage Vg and the phase θ of the output voltage V of the inverter 6 and calculating formulae (1), (3), and (6) by using the preset values and Δθ.

Depending on the value of Δθ, it may be possible to synchronize the phase θ and the phase θg with each other without raising the frequency of the output voltage of the inverter 6 up to the frequency upper limit value. A condition therefor is a case of $T_B \leq 0$ in formula (6). By transforming the right side of formula (6) to 0 or less, formula (7) is obtained.

[Formula 5]

$$\Delta\theta \leq \pi \Delta F_L^2 \left(\frac{1}{\Delta f_U} + \frac{1}{\Delta f_D}\right) \tag{7}$$

In this case, $\Delta\theta$ is a sum of $\Delta\theta_A$ and $\Delta\theta_C$, and a frequency change amount in the period $T_A$ is equal to that in the period $T_C$. Therefore, formulae (8) and (9) hold.

[Formula 6]

$$\Delta\theta = \pi\Delta f_U(T_A)^2 + \phi\Delta f_D(T_C)^2 \quad (8)$$

$$\Delta f_U T_A = \Delta_D T_C \quad (9)$$

Based on the above formulae (8) and (9), the period $T_A$ and the period $T_C$ can be expressed by formulae (10) and (11), respectively.

[Formula 7]

$$T_A = \sqrt{\frac{\Delta f_D}{\Delta f_U(\Delta f_U + \Delta f_D)\pi}\Delta\theta} \quad (10)$$

$$T_C = \sqrt{\frac{\Delta f_U}{\Delta f_D(\Delta f_U + \Delta f_D)\pi}\Delta\theta} \quad (11)$$

Based on formulae (10) and (11), the period $T_A$ and the period $T_C$ of a case without the period $T_B$ are uniquely determined. Accordingly, also in this case, the output frequency pattern calculator 25 can determine the output frequency pattern of the output voltage V of the inverter 6 by obtaining the phase difference $\Delta\theta$ between the phase $\theta g$ of the grid voltage Vg and the phase $\theta$ of the output voltage V of the inverter 6 and calculating formulae (10) and (11) by using the preset values and $\Delta\theta$.

The output frequency pattern calculator 25 supplies the inverter frequency selector 26 with a value of a frequency that changes based on the determined output frequency pattern.

When the power grid 4 is normal, the switchgears 8 and 9 are turned on, and the main circuit 2 is interconnected with the power grid 4, and thereby the power converter 1 performs the interconnected operation with the power grid 4. In this state, the controller 3 acquires the output current Iinv of the inverter 6 from the current detector 13, and calculates, at the current control unit 22, a voltage command value to follow a current command value provided from the externa device such as a host control device. At this time, the isolated operation selector 29 sets the power failure flag to "0", and sets the isolated operation flag to "0".

When an anomaly occurs in the power grid 4, the switchgear 8 is opened, and thereby downstream area of the switchgear 8 experiences a power failure. Thus, the control circuit 3 detects, at the isolated operation selector 29, that the value of the frequency fg of the grid voltage Vg detected at the second voltage detector 12 has deviated from a predetermined value (normal range), and sets the power failure flag to "1" and the isolated operation flag to "1". In response to this, the open/close command generator 28 supplies an open/close command to the switchgear 9 to open the switchgear 9.

When power fails in the power grid 4, the voltage control unit 21 calculates a voltage command value to follow a voltage command provided from the external device such as the host control device, and switches an input value of the inverter voltage command value selector 27. In addition, the voltage control unit 21 sets an output value (a fixed value of a rated frequency that is preset) of the output frequency pattern calculator 25 to the frequency f of the output voltage of the inverter 6.

When the power grid 4 recovers from a power failure, the value of the grid voltage Vg detected by the second voltage detector 12 and the value of the frequency fg of the grid voltage Vg respectively fall within predetermined values (normal ranges), which enables the isolated operation selector 29 to determine that the power grid 4 has recovered from the power failure. In response to this, the isolated operation selector 29 changes the power failure flag from "1" to "0". The output frequency pattern calculator 25 calculates the phase difference $\Delta\theta$ between the phase $\theta$ of the output voltage of the inverter 6 and the phase $\theta g$ of the grid voltage, and calculates the inverter output frequency pattern as described above.

The output frequency pattern calculator 25 changes the value of the frequency to be supplied to the inverter frequency selector 26 based on the calculated output frequency pattern. The inverter frequency selector 26 outputs the output value of the output frequency pattern calculator 25 as the frequency f of the inverter 6. At this time, an effective value of the output voltage V of the inverter 6 is made to follow an effective value of the grid voltage Vg at a predetermined voltage change rate based on a voltage command value input from the external device. Alternatively, control may be performed by correcting the voltage command value in the power converter in accordance with the effective value of the grid voltage Vg.

When the phase difference between the phase $\theta$ of the output voltage V of the inverter 6 and the phase $\theta g$ of the grid voltage Vg falls within a predetermined value, the isolated operation selector 29 determines that the interconnected operation mode needs to performed (the isolated operation flag "0"). When the isolated operation flag becomes "0", the open/close command generator 28 outputs a command to close the switchgear 9 of the power converter 1.

When the interconnected operation mode is set, control by the current control unit 22 is selected, and the input value of the inverter voltage command value selector 27 is switched to the output value of the current control unit 22. By setting the current command value at the time of starting the interconnected operation to zero, overcurrent at the time of re-interconnection can be reduced.

Switching between control by the voltage control unit 21 and control by the current control unit 22 may be performed in accordance with the value of the isolated operation flag, or may be performed by switching of a command value input by the host control device. When switching between the voltage control and the current control is performed in accordance with the value of the isolated operation flag, the value of the isolated operation flag may be supplied to the voltage control unit 21 and the current control unit 22.

<Effect>

Next, an effect in the above configuration will be described.

Figure 3:
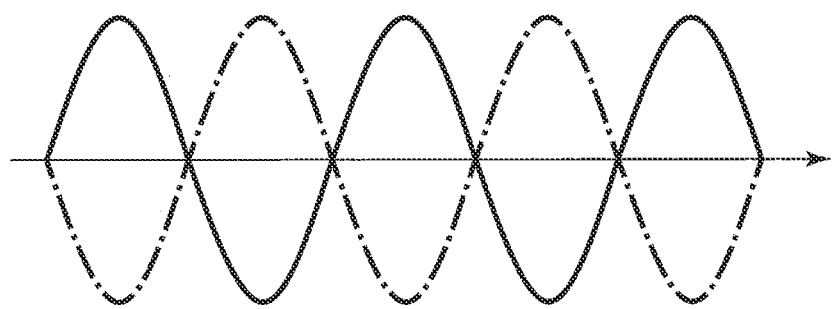
FIG. 3 is a diagram for explaining that there are two cases for synchronizing an inverter output with grid power.
Figure 3:
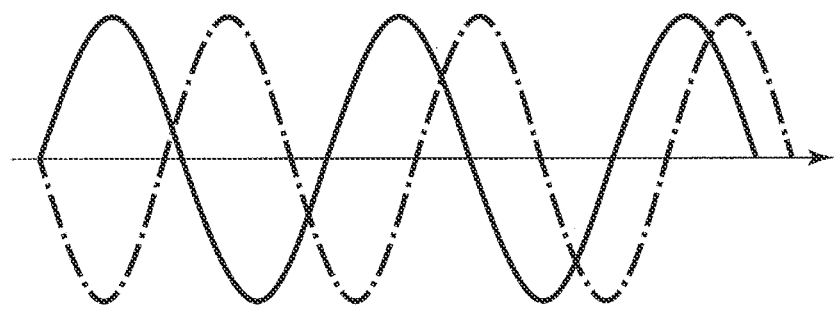
Figure 3:
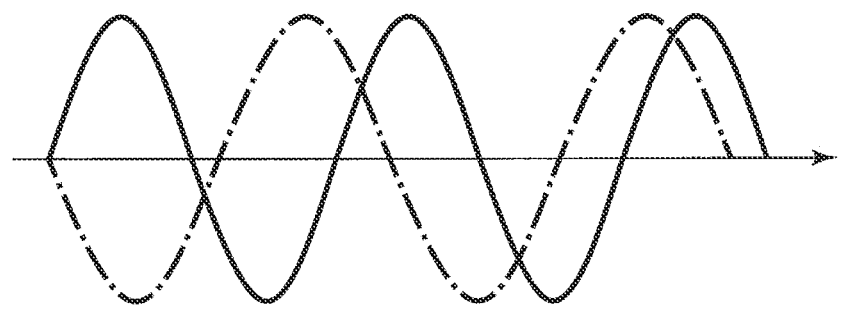

FIG. 3 is a diagram for explaining that there are two cases for synchronizing an inverter output with grid power. In the figure, a solid line shows a grid power waveform, and a one-dot chain line shows an inverter output waveform. At the time of grid power recovery, for example, as shown in FIG. 3(a), a phase of an inverter output waveform and a phase of a grid power waveform may be deviated by 180°. There are two possible cases to synchronize the two from this state. That is, there is a case in which the inverter frequency is increased at an initial stage of control (case 1), and a case in which the inverter frequency is decreased at the initial stage of control (case 2).

FIG. 3(b) shows a change in frequency in (case 1), and the phase of the inverter output catches up and is about to be synchronized with the phase of the grid power with a passage of time. In this case, the phase of the inverter output is synchronized with the phase of the grid power without a circulation delay.

FIG. 3(c) shows a change in frequency in (case 2), and the phase of the inverter output is synchronized with the phase of the grid power with a one-cycle delay with a passage of time. That is, the phase of the inverter output is synchronized with the phase of the grid power with a circulation delay. In actual control, a case is adopted in which a time required from the start of control to the completion of synchronization is short.

Next, an example is shown in which a synchronization period required for synchronizing the inverter output and the grid power is calculated separately for (case 1) and (case 2). In the following, we will consider voltage/frequency control when switching from an isolated operation mode to an interconnected operation mode, which is executed at the time of grid power recovery.

Figure 4:
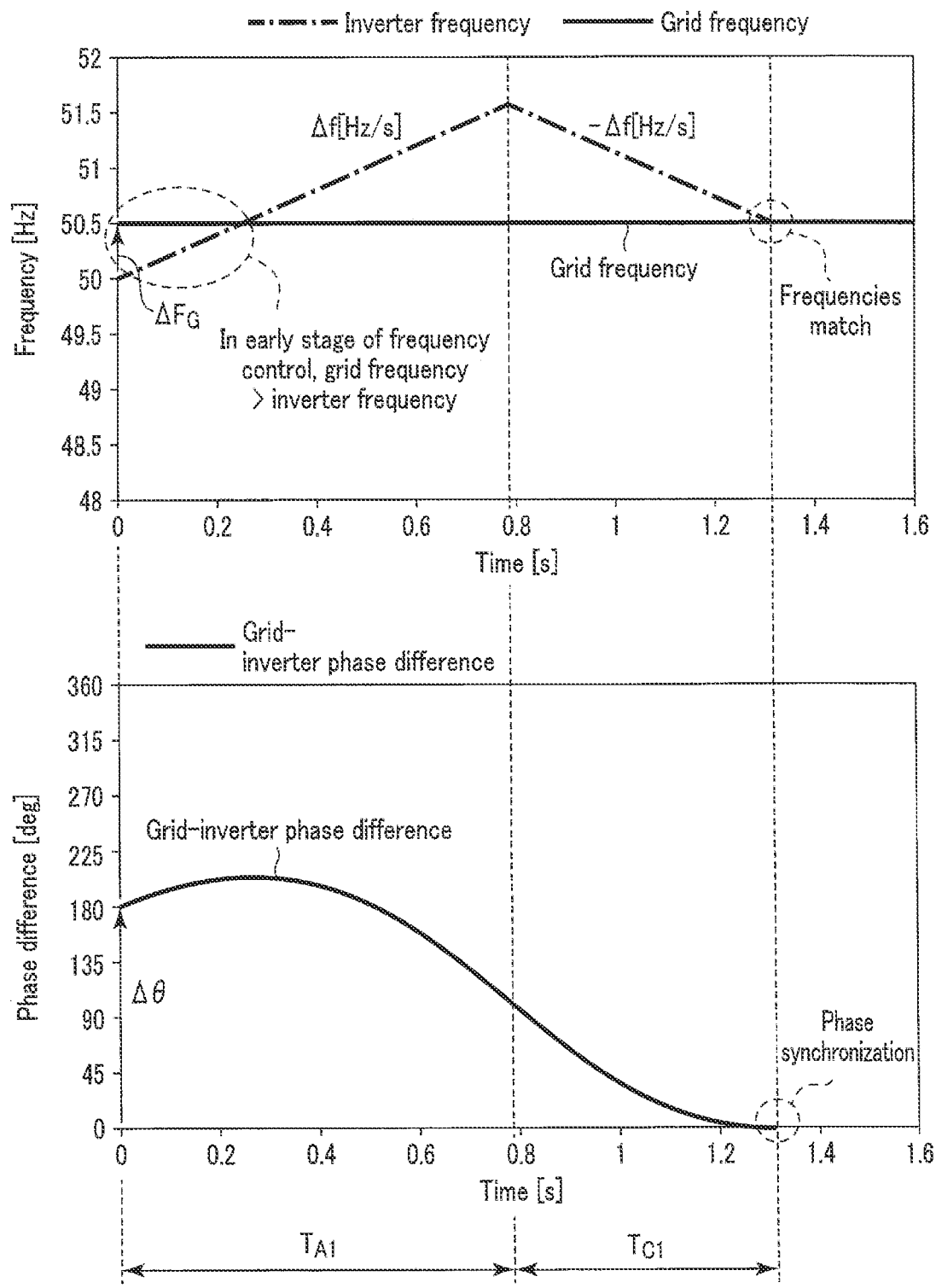
FIG. 4 is a diagram showing an example of a graph obtained by simulating a case of increasing an inverter frequency.

FIG. 4 is a diagram showing an example of a graph obtained by simulating (case 1). The graph of FIG. 4 is a plot of the frequencies of the inverter output and grid power and a phase difference therebetween with respect to time (horizontal axis). As an initial condition, it is assumed that the inverter frequency is 50 Hz, whereas the grid frequency fluctuates to 50.5 Hz. Grid frequency fluctuation at this time is $\Delta F_G = 0.5$ [Hz]. Further, a grid-inverter phase difference is $\Delta \theta = 180°$, and an inverter frequency change rate is $\Delta f = 2$ [Hz/s]. If the inverter frequency change rate ($\Delta f$) is a positive value, the frequency is increased, and if it is a negative value, the frequency is decreased. The inverter frequency change rate ($\Delta f$) can be a value that takes into consideration a withstand capacity of the load 5.

In FIG. 4, a period for increasing the frequency of the inverter 6 is $T_{A1}$, and a period for decreasing the frequency is $T_{C1}$. Here, it is assumed that there is no upper and lower limit value of the frequency. Then, $T_{A1}$ can be expressed by formula (12), and $T_{C1}$ can be expressed by formula (13).

[Formula 8]

$$T_{A1} = \frac{\Delta F_G}{\Delta f} + \sqrt{\frac{1}{2}\left(\frac{\Delta F_G}{\Delta f}\right)^2 + \frac{\Delta \theta}{2\pi \Delta f}} \qquad (12)$$

$$T_{C1} = \sqrt{\frac{1}{2}\left(\frac{\Delta F_G}{\Delta f}\right)^2 + \frac{\Delta \theta}{2\pi \Delta f}} \qquad (13)$$

When $\Delta \theta = 180°$, $\Delta F_G = 0.5$ [Hz], and $\Delta f = 2$ [Hz/s] are substituted into formulae (12) and (13), $T_{A1} = 0.78$ [s] and $T_{C1} = 0.53$ [s] are obtained. Since the synchronization period is a sum of these, $T_{A1} + T_{C1} = 1.31$ [s] is obtained. That is, in (case 1), the synchronization period=1.31 under the set initial condition.

Similarly, the synchronization period in (case 2) can be calculated.

Figure 5:
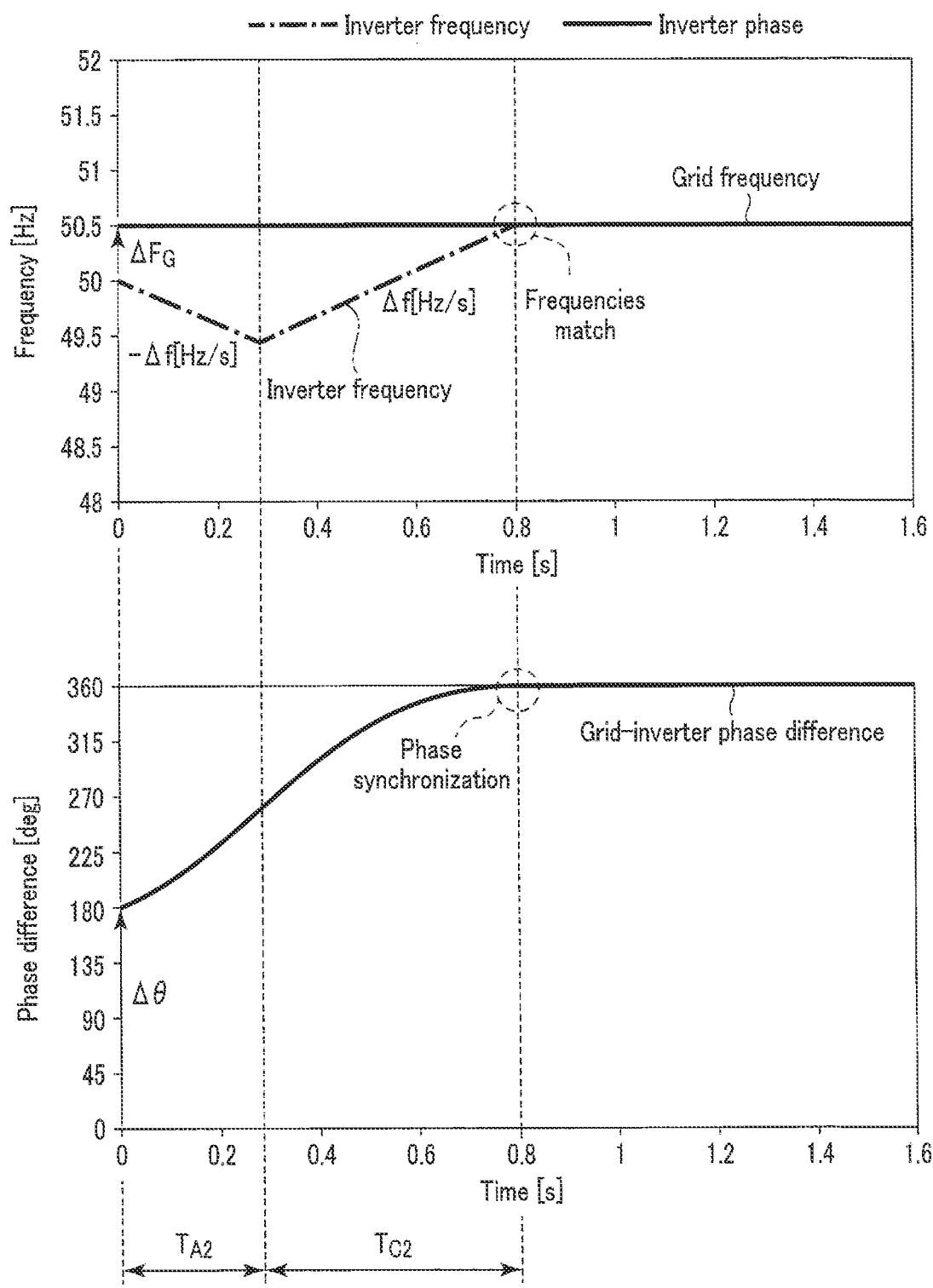
FIG. 5 is a diagram showing an example of a graph obtained by simulating a case of decreasing an inverter frequency.

FIG. 5 is a diagram showing an example of a graph obtained by simulating (case 2). As an initial condition, grid frequency fluctuation is $\Delta F_G = 0.5$ [Hz]. Further, a grid-inverter phase difference is $\Delta \theta = 180°$, and an inverter frequency change rate is of $\Delta f = -2$ [Hz/s].

In FIG. 5, a period for decreasing the frequency of the inverter 6 is $T_{A2}$, and a period for increasing it is $T_{C2}$. Here, it is assumed that there is no upper and lower limit value of the frequency. Then, $T_{A2}$ can be expressed by formula (14), and $T_{C2}$ can be expressed by formula (15).

[Formula 9]

$$T_{A2} = -\frac{\Delta F_G}{\Delta f} + \sqrt{\frac{1}{2}\left(\frac{\Delta F_G}{\Delta f}\right)^2 + \frac{2\pi - \Delta \theta}{2\pi \Delta f}} \qquad (14)$$

$$T_{C2} = \sqrt{\frac{1}{2}\left(\frac{\Delta F_G}{\Delta f}\right)^2 + \frac{2\pi - \Delta \theta}{2\pi \Delta f}} \qquad (15)$$

When $\Delta \theta = 180°$, $\Delta F_G = 0.5$ [Hz], and $\Delta f = 2$ [Hz/s] are substituted into formulae (14) and (15), $T_{A2} = 0.28$ [s] and $T_{C2} = 0.53$ [s] are obtained. Since the synchronization period is a sum of these, $T_{A2} + T_{C2} = 0.81$ [s] is obtained. That is, in (case 2), the synchronization period=0.81 under the set initial condition.

Namely, in the above simulation, a result of $T_{A2} + T_{C2} < T_{A1} + T_{C1}$ is obtained. Therefore, in this example, a result is that (case 2) has a shorter synchronization period.

Figure 6:
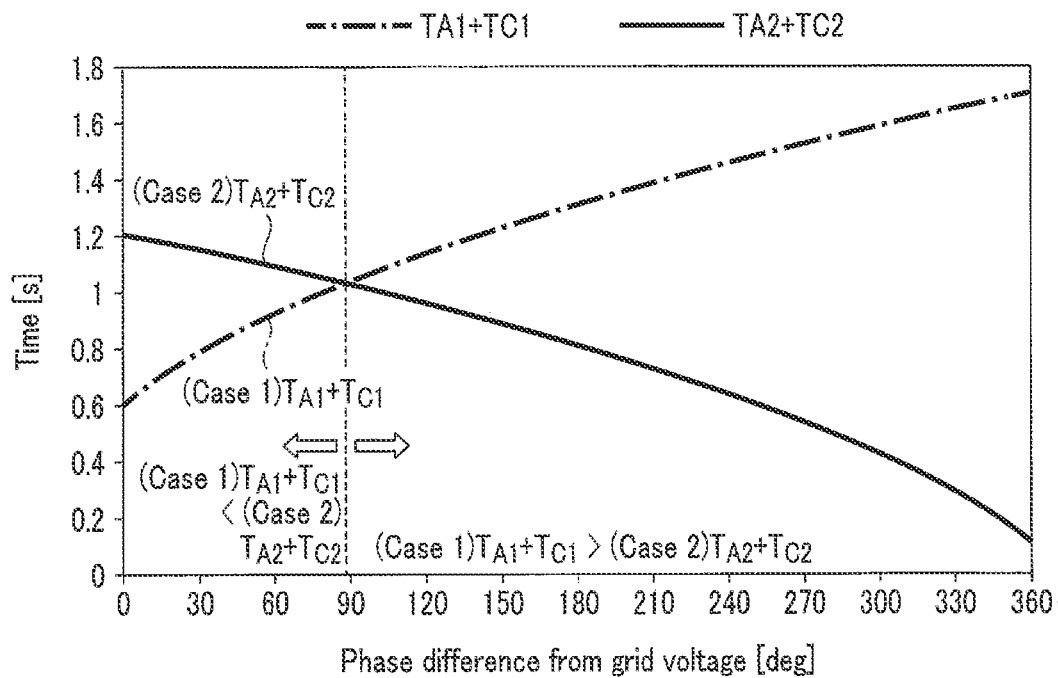
FIG. 6 is a graph obtained by simulating a relationship between an initial phase difference and a synchronization period in (case 1) and (case 2).

FIG. 6 is a graph obtained by simulating a relationship between the initial phase difference and the synchronization period in (case 1) and (case 2). In FIG. 6, grid frequency fluctuation is $\Delta F_G = +0.5$ [Hz]. It can be seen that the synchronization period in this case is shorter in (case 1) when the initial phase difference is smaller than 88°, and shorter in (case 2) when the initial phase difference is larger than 88°.

Figure 7:
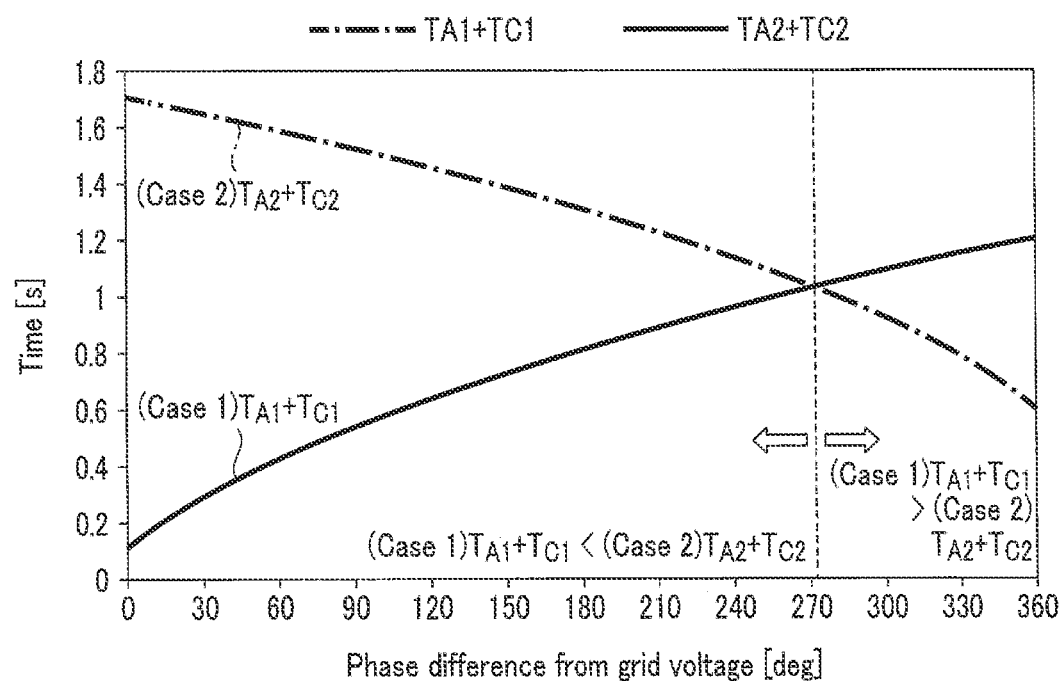
FIG. 7 is a graph obtained by simulating a relationship between an initial phase difference and a synchronization period in (case 1) and (case 2).

FIG. 7 is a graph obtained by simulating a relationship between the initial phase difference and the synchronization period in (case 1) and (case 2). In FIG. 7, grid frequency fluctuation is $\Delta F_G = -0.5$ [Hz]. It can be seen that the synchronization period in this case is shorter in (case 1) when the initial phase difference is smaller than 272°, and shorter in (case 2) when the initial phase difference is larger than 272°.

Up to this point, it has been assumed that the period $T_B$ during which the frequency is constant is not included. Next, a case in which the frequency upper and lower limit value $\Delta F_R$ is taken into consideration will be described. In this case, the frequency pattern will include the period $T_B$.

Figure 8:
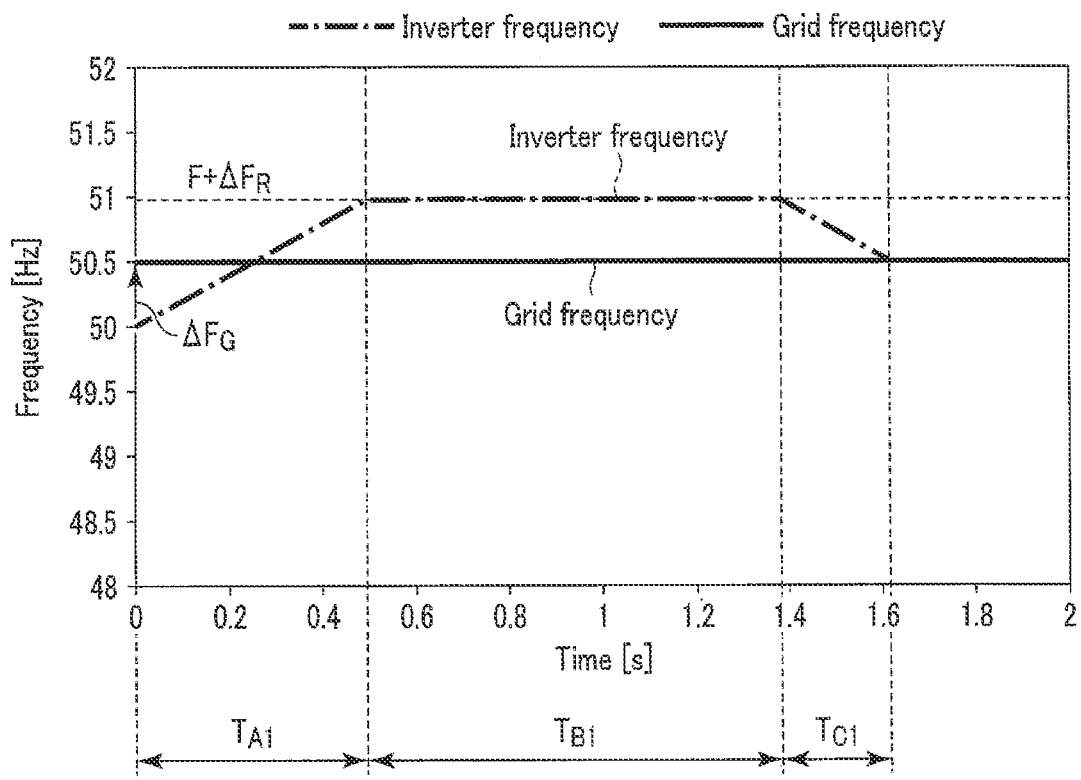
FIG. 8 is a diagram showing another example of the graph obtained by simulating the case of increasing the inverter frequency.

FIG. 8 is a graph showing a simulation result when a period $T_{B1}$ is included in (case 1). In this case, the inverter frequency rises by $\Delta F_G$, but becomes a constant value when $F + \Delta F_R$ is reached. Formulae (16) to (18) can be formulated for $T_{A1}$, $T_{B1}$, and $T_{C1}$, but formulae (16) to (18) are established only when $T_{B1}$ is >0.

[Formula 10]

$$T_{A1} = \frac{\Delta F_R}{\Delta f} \qquad (16)$$

$$T_{B1} = \frac{\Delta \theta - 2\pi \frac{(\Delta F_R - \Delta F_G)^2}{\Delta f} + \pi \frac{\Delta F_G}{\Delta f}}{2\pi(\Delta F_R - \Delta F_G)} \qquad (17)$$

$$T_{C1} = \frac{\Delta F_R - \Delta F_G}{\Delta f} \qquad (18)$$

Figure 9:
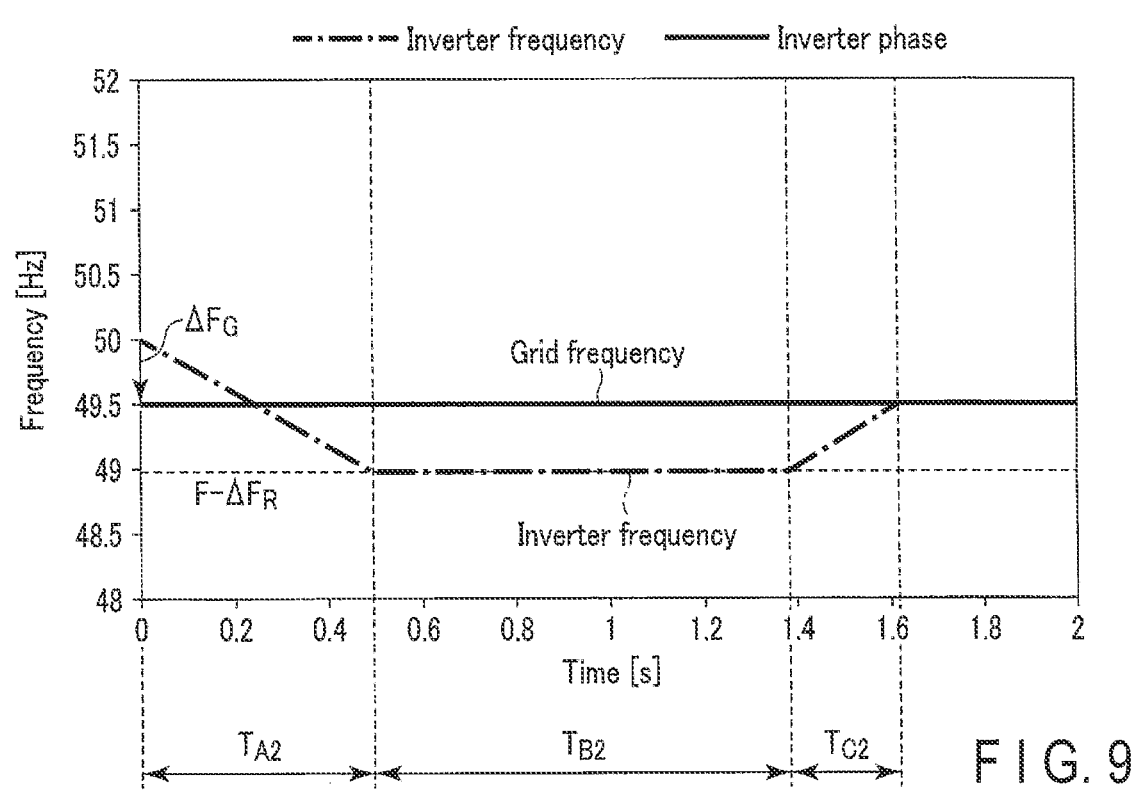
FIG. 9 is a diagram showing another example of the graph obtained by simulating the case of decreasing the inverter frequency.

FIG. 9 is a graph showing a simulation result when the period $T_{B2}$ is included in (case 2). In this case, the inverter frequency decreases by $\Delta F_G$, but becomes a constant value when $F - \Delta F_R$ is reached. Formulae (19) to (21) can be formulated for $T_{A2}$, $T_{B2}$, and $T_{C2}$, but formulae (19) to (21) are established only when $T_{B2}$ is >0.

[Formula 11]

$$T_{A2} = \frac{\Delta F_R}{\Delta f} \quad (19)$$

$$T_{B2} = \frac{2\pi - \Delta\theta - 2\pi\frac{(\Delta F_R + \Delta F_G)^2}{\Delta f} + \pi\frac{\Delta F_G}{\Delta f}}{2\pi(\Delta F_R + \Delta F_G)} \quad (20)$$

$$T_{C2} = \frac{\Delta F_R + \Delta F_G}{\Delta f} \quad (21)$$

Figure 10B:
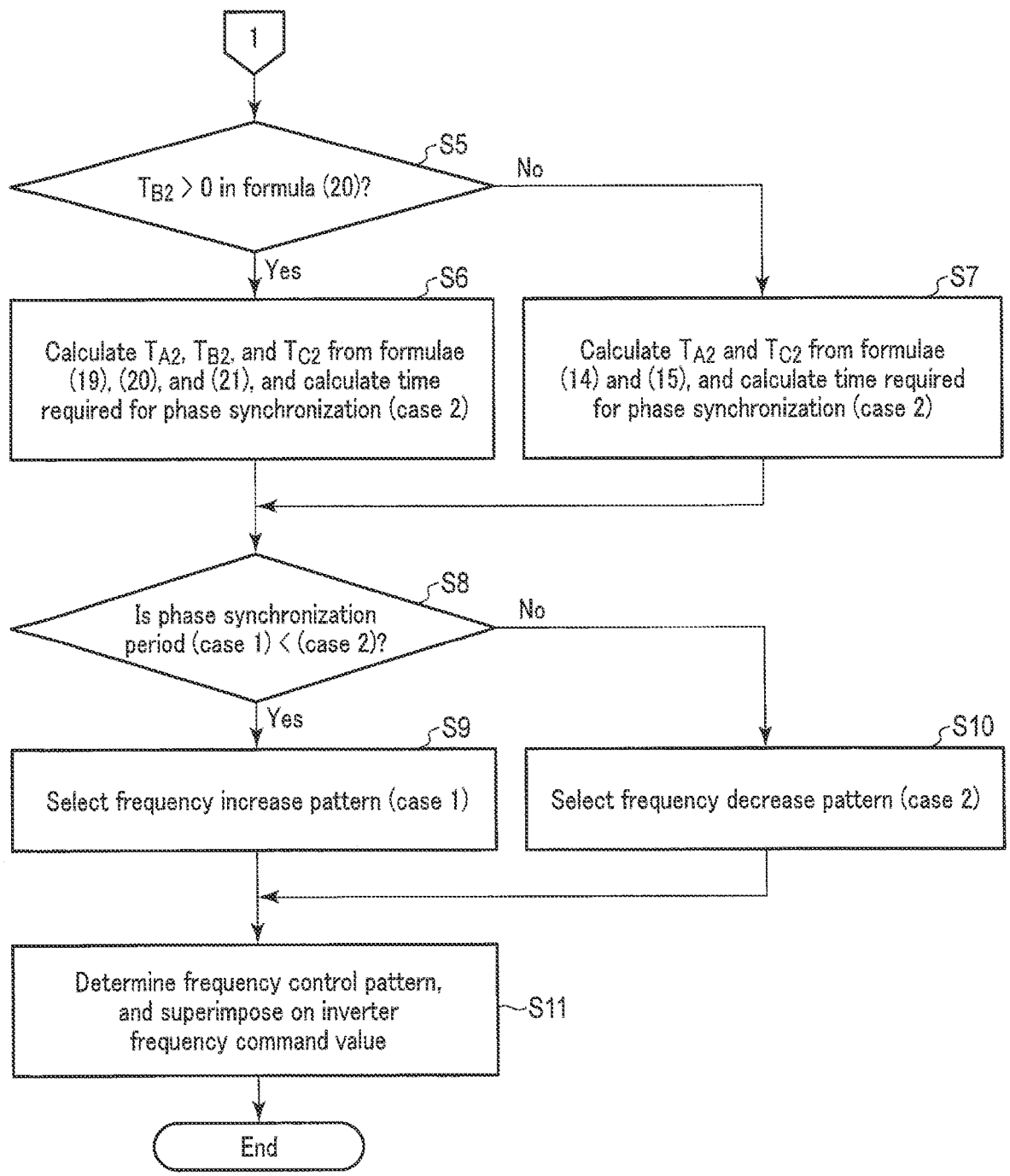
FIG. 10B is a flowchart showing an example of the processing procedure related to the control of the output frequency of the inverter 6.

FIGS. 10A and 10B are flowcharts showing an example of a processing procedure related to control of the output frequency of the inverter 6. In FIG. 10A, when the power grid 4 recovers power, frequency control of the inverter 6 is started as a step before switching from an isolated operation mode to an interconnected operation mode. Then, the controller 3 first acquires each value of $\Delta\theta$ (grid-inverter phase difference), $\Delta F_G$ (grid frequency fluctuation), $\Delta f$ (inverter frequency change rate), and $\Delta F_R$ (frequency upper and lower limit value) (step S1).

Next, the controller 3 calculates formula (17) under the acquired conditions, and determines whether or not $T_{B1}$ appears (step S2). If formula (17) takes a positive value (Yes), the controller 3 calculates $T_{A1}$, $T_{B1}$, and $T_{C1}$ using formulae (16) to (18) and calculates a synchronization period in (case 1) (step S3). On the other hand, if formula (17) becomes negative (No), the controller 3 calculates $T_{A1}$ and $T_{C1}$ using formulae (12) and (13) and calculates the synchronization period in (case 1) (step S4). Then, the processing procedure shifts to FIG. 10B.

Next, the controller 3 calculates formula (20) and determines whether or not $T_{B2}$ appears (step S5). If formula (20) takes a positive value (Yes), the controller 3 calculates $T_{A2}$, $T_{B2}$, and $T_{C2}$ using formulae (19) to (21) and calculates a synchronization period in (case 2) (step S6). On the other hand, if formula (20) becomes negative (No), the controller 3 calculates $T_{A2}$ and $T_{C2}$ using formulae (14) and (15) and calculates the synchronization period in (case 2) (step S7).

Then, the controller 3 compares the synchronization period in (case 1) with the synchronization period in (case 2) (step S8), and if the synchronization period in (case 1) is short (Yes), selects a pattern for increasing the frequency (step S9). If the synchronization period in (case 2) is short (No), a pattern for decreasing the frequency is selected (step S10). As a result, a frequency control pattern based on the shortest synchronization period is generated.

Finally, the controller 3 determines a frequency control pattern, superimposes a frequency control amount indicated by that pattern on an inverter frequency command value (step S11), and outputs the frequency control amount.

Figure 11:
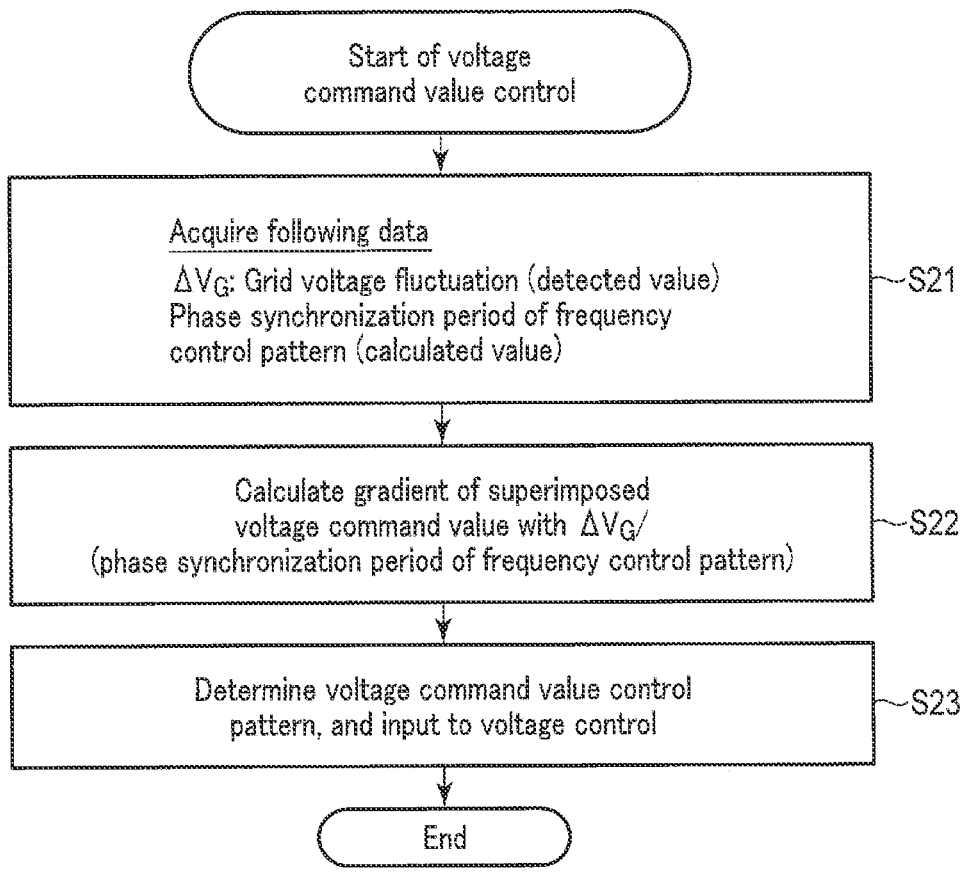
FIG. 11 is a flowchart showing an example of a processing procedure related to control of an output voltage of the inverter 6.

FIG. 11 is a flowchart showing an example of a processing procedure related to control of an output voltage of the inverter 6. When the power grid 4 recovers power, control of an output voltage of the inverter is started along with frequency control of the inverter 6. Then, the controller 3 first acquires $\Delta V_G$ (grid voltage fluctuation) and the shorter synchronization period in step S8 (step S21).

Next, the controller 3 obtains a value obtained by dividing $\Delta V_G$ by the synchronization period, and calculates a gradient of a voltage command value (step S22). Finally, the controller 3 determines a voltage command value control pattern, and inputs it to the voltage control unit 21 as a voltage control command value (step S23).

Figure 12:
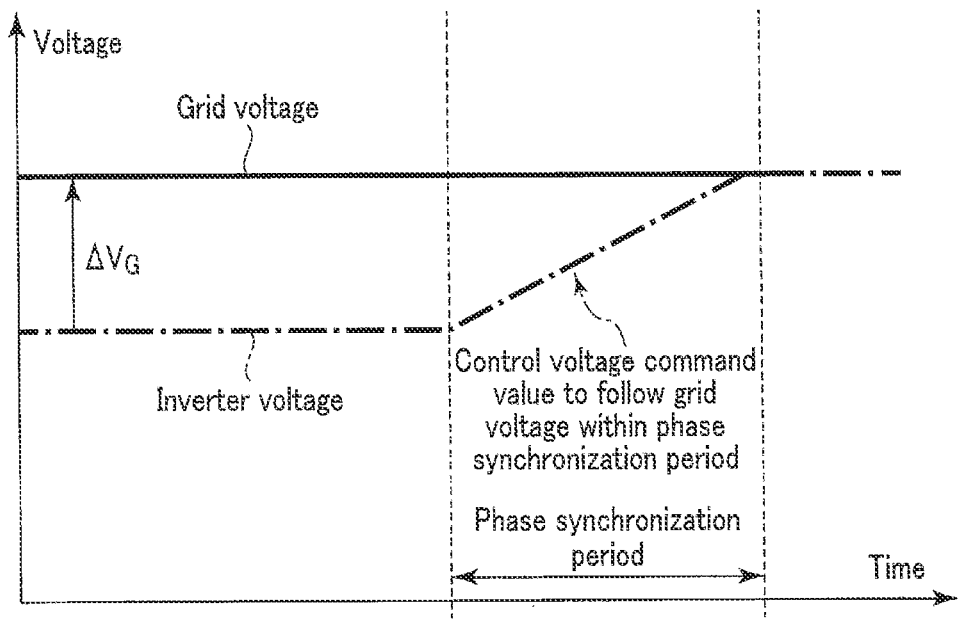
FIG. 12 is a graph showing an example of a change in inverter voltage that follows a grid voltage.

FIG. 12 is a graph showing an example of a change in inverter voltage that follows a grid voltage. In FIG. 12, when control based on voltage command value is started, an inverter voltage is controlled to be changed at a constant rate of change, for example, in order to follow a grid voltage in a synchronization period. As a result, an inverter output is synchronized with grid power, and at the same time, voltage values of the two become the same. By executing the mode switching from the isolated operation mode to the interconnected operation mode after this state is realized, it is possible to realize the switching in the shortest time without imposing an excessive load on the electric load.

<Effect>

As described above, in the embodiment, the configuration for realizing the phase synchronization method and the voltage following method taking into consideration the frequency fluctuation and the voltage fluctuation at the time of power recovery of the grid has been described. That is, when there is a frequency fluctuation at the time of power recovery, a phase synchronization period when the frequency is increased and a phase synchronization period when the frequency is decreased are obtained, and an output frequency pattern based on whichever synchronization period is shorter is adopted. Moreover, in the output frequency pattern, by setting the inverter frequency change rate ($\Delta f$) to a value that takes into consideration the withstand capacity of the electric load 5, the electric load 5 is not overloaded. Further, when there is a voltage fluctuation at the time of power recovery, a voltage command value is controlled so as to follow a grid voltage within a synchronization period under the above output frequency pattern.

From these facts, according to the embodiment, it becomes possible to provide a power converter capable of quickly switching between the isolated operation mode and the interconnected operation mode without exceeding the load capacity. In addition, it can be smoothly interconnected with the power grid and can continuously supply power to the electric load without interruption.

The present invention is not limited to the above-described embodiment. For example, the controller 3 shown in FIG. 1 may be formed by hardware, software, or a combination thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power converter comprising:
an inverter configured to selectively operate in an interconnected operation mode or an isolated operation mode and to convert DC power into AC power, wherein, in the interconnected operation mode, the inverter and a power grid are connected to an electric load, and, in the isolated operation mode, the inverter is connected to the eltric load and the power grid is electrically separated from the electric load due to an occurrence of an anomaly in the power grid; and
a controller,
wherein, in the isolated operation mode, the controller
detects a frequency difference and a phase difference between the AC power from the inverter and AC power from the power grid, calculates, based on the frequency difference and the phase difference, an output frequency pattern to be used for synchronizing the AC power from inverter with the AC power from the power grid, and controls, for switching from the isolated operation mode to the interconnected operation mode, a frequency of the AC power from the inverter based on the output frequency pattern.

2. The power converter according to claim 1, wherein the controller calculates the output frequency pattern so that a change in the frequency of the AC power from the inverter is within a range of a withstand capacity of the electric load.

3. The power converter according to claim 1, wherein the output frequency pattern includes a first pattern in which the phase of the AC power from the inverter is synchronized with the phase of the AC power from the power grid without a circulation delay and a second pattern in which the phase of the AC power from the inverter is synchronized with the phase of the AC power from the power grid with the circulation delay, and the controller calculates one of the first pattern and the second pattern having shorter synchronization period.

4. The power converter according to claim 1, wherein
the controller detects an effective value of a voltage of each of AC power from the inverter and the AC power from the grid, and controls, for the switching from the isolated operation mode to the interconnected operation mode, a voltage of the AC power from the inverter so that the effective value of the voltage of the AC power from the inverter follows the effective value of the voltage of the AC power from the power grid.

5. The power converter according to claim 1, wherein the controller controls the frequency of the AC power from the inverter at a default frequency change rate.

6. The power converter according to claim 4, wherein the controller controls the effective value of the voltage of the AC power from the inverter at a default voltage change rate.

7. The power converter according to claim 1, further comprising:
a switchgear placed between the inverter and the power grid;
a first voltage detector placed between the inverter and the switchgear and configured to detect a first voltage value of the AC power converted by the inverter; and a second voltage detector placed between the switchgear and the power grid and configured to detect a second volatge value of the AC power from the power grid, wherein the controller,
when it is detected that the anomaly occurs in the power grid based on the second voltage value, opens the switchgear and switches an operation mode from the interconnected operation mode to the isolated operation mode, and when it is detected that the power grid is recovered from the anomaly based on the second volatge value, detects the frequency difference and the phase difference between the AC power from the inverter and the AC power from the power grid using the first voltage value and the second voltage value.

8. The power converter according to claim 7, wherein the controller calculates the output frequency pattern so that a change in the frequency of the AC power from the inverter is within a range of a withstand capacity of the electric load.

9. The power converter according to claim 7, wherein the output frequency pattern includes a first pattern in which the phase of the AC power from the inverter is synchronized with the phase of the AC power from the power grid without a circulation delay and a second pattern in which the phase of the AC power from the inverter is synchronzied with the phase of the AC power from the power grid with the circulation delay, and the controller calculates one of the first pattern and the second pattern having shorter synchronization period.

10. The power converter according to claim 7, wherein
the controller detects an effective value of a voltage of each of AC power from the inverter and the AC power from the power grid, and controls, for the switching from the isolated operation mode to the interconnected operation mode, a volatge of the AC power from the inverter so that the effective value of the voltage of the AC power from the inverter follows the effective value of the voltage of the AC power from the power grid.

11. The power converter according to claim 7, wherein the controller controls the frequency of the AC power from the inverter at a default frequency change rate.

12. The power converter according to claim 10, wherein the controller controls the effective value of the voltage of the AC power from the inverter at a default voltage change rate.

* * * * *

UNITED STATES PATENT AND TRADEMARK OFFICE
CERTIFICATE OF CORRECTION

PATENT NO. : 11,923,789 B2
APPLICATION NO. : 17/901389
DATED : March 5, 2024
INVENTOR(S) : Yuusuke Kouno et al.

It is certified that error appears in the above-identified patent and that said Letters Patent is hereby corrected as shown below:

In the Claims

Claim 1, Column 14, Line 60, "elctric" should read as --electric--.

Claim 7, Column 16, Line 3, "volatge" should read as --voltage--.

Claim 7, Column 16, Line 11, "volatge" should read as --voltage--.

Claim 9, Column 16, Line 24, "synchronzied" should read as --synchronized--.

Claim 10, Column 16, Line 34, "volatge" should read as --voltage--.

Signed and Sealed this
Thirtieth Day of July, 2024

Katherine Kelly Vidal
*Director of the United States Patent and Trademark Office*